Apr. 3, 1923.
W. FILIPOWSKI
FISHHOOK
Filed Apr. 29, 1922
1,450,798
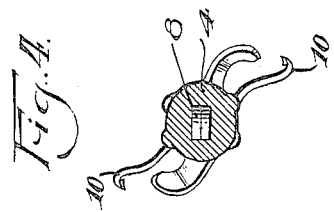
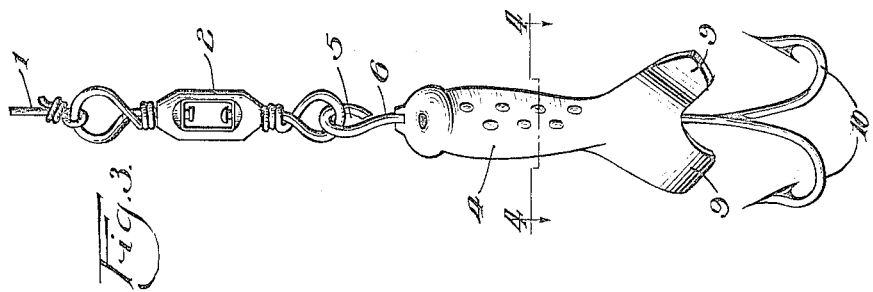
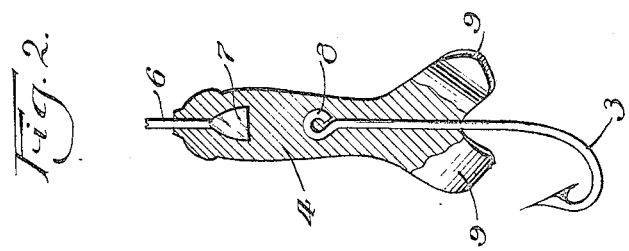
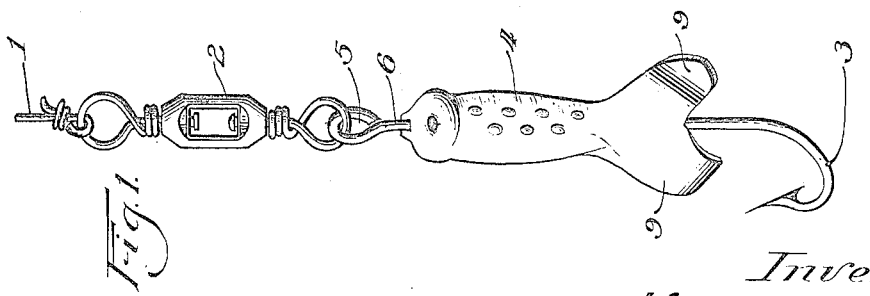
Inventor:
Wladyslaw Filipowski
By Burton & Burton
Atty's.

Patented Apr. 3, 1923.

1,450,798

UNITED STATES PATENT OFFICE.

WLADYSLAV FILIPOWSKI, OF CHICAGO, ILLINOIS.

FISHHOOK.

Application filed April 29, 1922. Serial No. 557,326.

*To all whom it may concern:*

Be it known that I, WLADYSLAV FILIPOWSKI, a citizen of the United States, and a resident of the city of Chicago, in the county of Cook and the State of Illinois, have invented certain new and useful Improvements in Fishhooks, of which the following is a specification, reference being had to the accompanying drawings, forming a part thereof.

The purpose of this invention is to provide an improved form of fishing tackle in which a fish-hook is combined with an artificial bait which serves also as a sinker and is adapted to whirl as it moves through the water, thus adding to is attractiveness. It consists of certain features and elements of construction and their combination hereinafter described and shown in the drawings, as indicated by the claims.

In the drawings:

Figure 1 is a side elevation of a fishhook embodying this invention and connected by a swivel to a fish-line.

Figure 2 is a vertical section showing how the shank of the hook is cast in the bait member.

Figure 3 is a side elevation similar to Figure 1, showing a double hook associated with the bait.

Figure 4 is a transverse section taken as indicated at line 4—4 on Figure 3.

In the drawings the end of the fish-line, 1, is shown tied into one eye of a swivel fitting, 2, to the opposite end of which the combined hook and bait embodying this invention is secured. The hook member, 3, has its shank rigidly secured in the bait, 4, which is preferably a lead casting in the form of body of a small fish, and from the head end of the body, 4, a wire loop or eye, 5, extends for atachment to the swivel, 2. The shank, 6, of the loop, 5, is flattened at 7, this portion being rigidly secured to the body, 4, by casting the latter around it. The eye, 8, of the fish-hook, 3, may be of the usual form, and it serves the same function as the flattened portion, 7, of the shank, 6,—namely, to anchor the hook in the cast body of the bait, 4.

Preferably the bait, 4, will be a lead casting, which provides a fairly bright surface sufficiently attractive for its purpose as a bait, though if desired, it may be further enhanced by painted decoration; and its attractiveness is further increased by bending the blades, 9, of the bifurcated tail of the fish body so that they shall constitute propellers serving to twist or whirl the body, 4, about its longitudinal axis as it is moved through the water. If the fish-line is of light weight, it may be attached directly to the eye, 5, and will twist to a limited extent to permit this twisting of the bait; but the provision of the swivel, 2, will allow any amount of rotation of the bait without twisting the line, 1.

Figures 3 and 4 illustrate a slight modification in which two hooks, 10, which may be exactly similar to the hook, 3, of Figure 1, are laid into the mold at the time the bait body, 4, is cast, so that the eyes, 8, lie flat against each other while the hook ends extend oppositely from the longitudinal axis.

As indicated in Figure 4, the cross section of the body portion of the bait, 4, is substantially circular, as this form offers the least resistance to the rotation of the bait about its axis, when the blades, 9, are moved through the water. It will be understood that the bait body shown in Figures 1 and 2, is of similar cross section to that indicated by Figure 4.

It may be understood that, if preferred, a hook having a longer shank may be substituted for the hook, 3, and eye, 5, so that such longer shank may extend entirely through the body, 4, of the bait, and the eye at the upper end of the shank may be utilized for direct connection to the fishline, or to the swivel, without the provision of the extra part, 5, 6, 7. Exteriorly, such a construction would have the same appearance as that illustrated in Figure 1.

I claim:

1. A cast metallic bait formed to simulate a fish-body, with a bifurcated tail, having the two parts thereof bent oppositely to constitute a propeller for causing rotation of the bait about its longitudinal axis.

2. In combination, a cast metallic bait formed to simulate a fish-body, with a bifurcated tail, having the two parts thereof bent oppositely to constitute a propeller for causing rotation of the bait about its longitudinal axis, and a fish-hook having its shank embedded in the bait.

3. A fish-bait comprising an elongated body of substantially circular cross section having laterally extending blades bent or curved to operate as propellers to rotate the body about its longitudinal axis as it is moved through the water.

4. In combination with a fish-bait as defined in claim 3, a fish-hook having its shank embedded in said body along its said axis with the hook portion extending therefrom at one end.

5. In combination with a fish-bait as defined in claim 3, a fish-hook having its shank embedded in said body along its said axis with the hook portion extending therefrom at one end, and a swivel attached to the other end for connection with the fish-line.

6. In combination with a fish-bait as defined in claim 3, a fish-hook having its shank embedded in said body along its said axis with the hook portion extending therefrom at one end, and means at the other end for attaching the bait to a fish-line.

7. In combination with a fish-bait as defined in claim 3, a fish-hook having its shank embedded in said body along its said axis with the hook portion extending therefrom at one end, and an eye member for attachment to a fish-line having a shank with a deformed end portion embedded in the body of said bait and extending therefrom at the end opposite the hook.

8. The combination of a cast metallic body comprising a fish-bait of substantially circular cross section with a bifurcated tail portion bent to constitute a propeller for rotating the body as it is moved through the water, a pair of fish-hooks, each formed at one end with a flat eye arranged with their shanks adjacent, and with said flat eyes disposed in parallel planes embedded in the body of the bait, the hook portions extending from one end of said body and curving oppositely from its longitudinal axis, together with means at the other end of the body for attaching the device to a fish-line.

In testimony whereof, I have hereunto set my hand at Chicago, Illinois, this 27th day of April, 1922.

WLADYSLAV FILIPOWSKI.